(12) United States Patent
Izumiya et al.

(10) Patent No.: US 7,079,172 B2
(45) Date of Patent: Jul. 18, 2006

(54) CLOCK GENERATING CIRCUIT AND IMAGE-FORMING APPARATUS

(75) Inventors: Kenji Izumiya, Hachioji (JP); Hiroyuki Maruyama, Hachioji (JP); Tadayuki Ueda, Hachioji (JP); Ryuji Okutomi, Hachioji (JP); Eiji Nishikawa, Hachioji (JP); Satoshi Ogata, Hachioji (JP); Shinobu Kishi, Hachioji (JP)

(73) Assignee: Konica Corporation, Tokyo (JP)

( * ) Notice: Subject to any disclaimer, the term of this patent is extended or adjusted under 35 U.S.C. 154(b) by 949 days.

(21) Appl. No.: 10/032,185

(22) Filed: Dec. 21, 2001

(65) Prior Publication Data

US 2002/0085241 A1    Jul. 4, 2002

(30) Foreign Application Priority Data

Dec. 28, 2000   (JP)   ............................. 2000-399841

(51) Int. Cl.
*B41J 2/435*   (2006.01)
(52) U.S. Cl. ..................................... 347/249
(58) Field of Classification Search ................ 347/229, 347/233–237, 246–254, 240; 375/226
See application file for complete search history.

(56) References Cited

U.S. PATENT DOCUMENTS

| 4,958,187 | A | 9/1990 | Tsuchiya et al. |
| 6,219,085 | B1 * | 4/2001 | Hanna ......................... 347/249 |
| 6,259,467 | B1 * | 7/2001 | Hanna ......................... 347/249 |
| 6,493,019 | B1 * | 12/2002 | Hirasawa .................... 347/233 |

FOREIGN PATENT DOCUMENTS

| EP | 0 704 977 A2 | 4/1996 |
| EP | 0 998 115 A2 | 5/2000 |
| JP | 2000-198235 A | 7/2000 |
| JP | 2000-246959 A | 9/2000 |

OTHER PUBLICATIONS

Der Fernmelde-Ingenieur, No. 7, Jul. 15, 1979, XP002291806 Verlag Fur Wissenschaft Und Leben Georg Heidecker, Bad Winsheim.
Sevalia P: "Straightforward Techniques Cut Jitter in PLL-Based Clock Drivers" EDN Electrical Design News, Cahners Publishing Co., Newton, Massachusetts, US, vol. 40, No. 24, Nov. 23, 1995, pp. 119-122, 125, XP000546022, ISSN: 0012-7515.

* cited by examiner

*Primary Examiner*—Hai Pham
(74) *Attorney, Agent, or Firm*—Frishauf, Holtz, Goodman & Chick, P.C.

(57) ABSTRACT

The invention concerns an image-forming apparatus employing a clock-generating circuit, which generates dot clock pulses utilized for an image-writing section of the image-forming apparatus. The clock-generating circuit includes a digital-delay dot clock adjusting section to generate first dot clock pulses having a predetermined number of pulses within a predetermined time interval at a constant exposing range of the image-writing section, wherein each period of the first dot clock pulses is slightly increased or reduced by changing a selection for a plurality of delayed clock pulses, which are generated by delaying clock-pulses, outputted from a reference oscillator, in slightly different delay times; and a jitter suppressing section to suppress a jitter component included in the first dot clock pulses, wherein the jitter suppressing section divides the first dot clock pulses to generate second dot clock pulses, and then, multiplies the second dot clock pulses to generate the dot clock pulses.

6 Claims, 10 Drawing Sheets

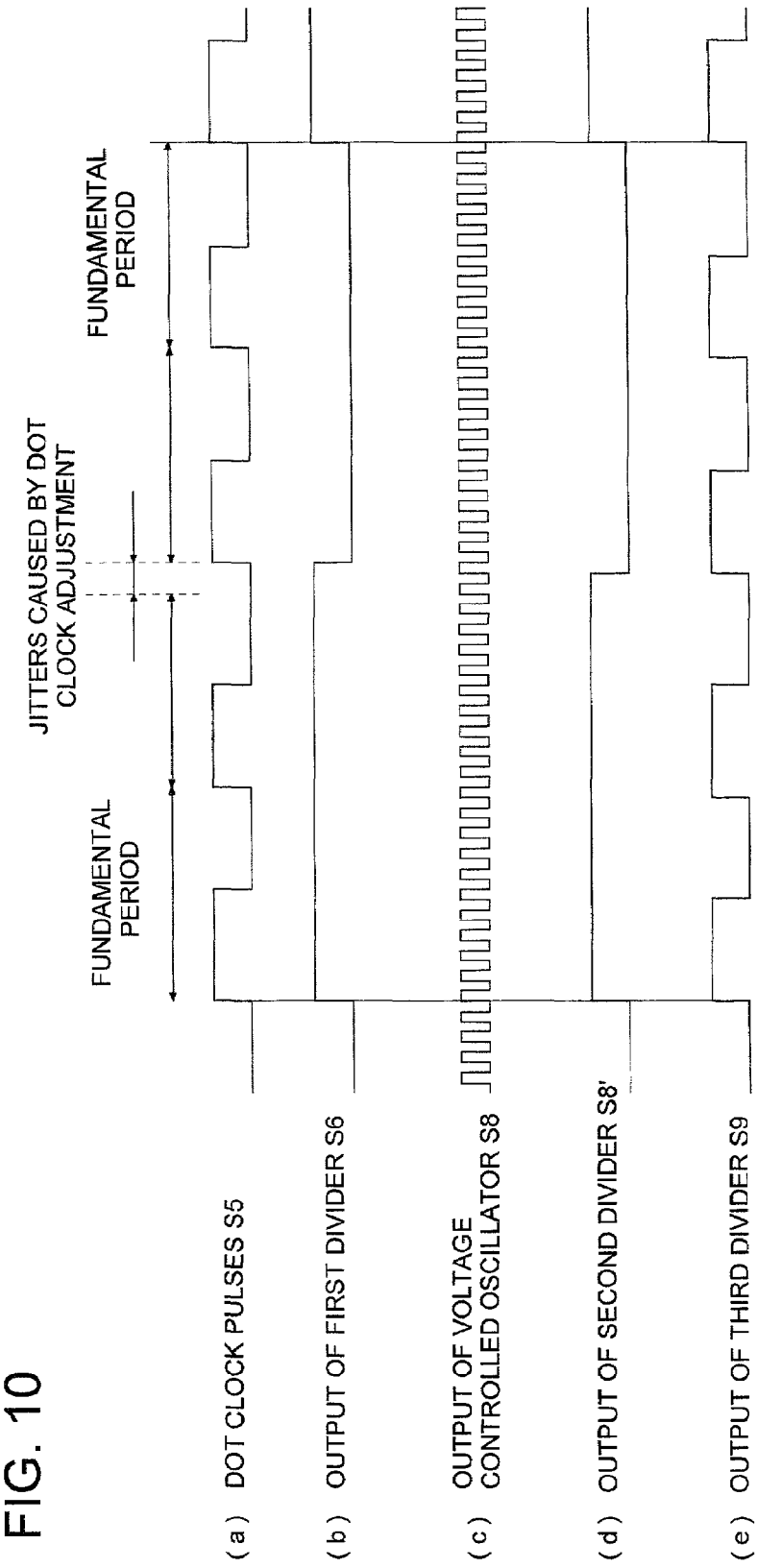

CLOCK GENERATING CIRCUIT AND IMAGE-FORMING APPARATUS

BACKGROUND OF THE INVENTION

The present invention relates to image-forming apparatus employing a clock-generating circuit, and specifically relates to an image-forming apparatus employing a clock-generating circuit capable of adjusting a number of reference clock-pulses at a predetermined number within a predetermined time interval.

In an image forming apparatus, an image is formed on an image-bearing member by scanning the image-bearing member, which is rotating in the direction of sub-scanning by a laser beam, which is modulated in accordance with image data in the direction of main scanning. In this case, on the basis of reference clock-pulses called dot clock pulses, the laser beam is modulated by the image data.

Accordingly, in accordance with the predetermined number of the dot clock pulses, it is necessary to generate the dot clock pulses in order that the length of the image to be formed on the image-bearing member in a main scanning direction should be always kept constant.

Further, in recent years it has been developed a color image forming apparatus equipped with a plurality of units comprising means for charging, exposure, and development respectively in the vicinity of the image-bearing member, on which a color toner image are formed during one revolution of it, and transferring the images altogether onto a recording paper at a time. On the other hand, it has been also developed a color image forming apparatus equipped with a plurality of image-bearing members in the vicinity of an intermediate transfer member and equipped with means for charging, exposure, development, and transfer around the image-bearing members respectively, transferring the toner images having been formed on the respective image-bearing members sequentially onto the intermediate transfer member, and transferring the color toner images born on the intermediate transfer member altogether onto the recording paper at a time.

In an image forming apparatus of the former type, the length of the image, formed on the image-bearing member in accordance with the predetermined number of the dot clock pulses, sometimes, fluctuates due to variations of the rotation number of the polygonal mirror performing the main scanning operation, the aberration of the optical system, etc.

On the other hand, in an image forming apparatus like the latter one, which employs a plurality of exposing means to form color toner images on the image-bearing member or the intermediate transfer member, owing to the dispersion of the characteristics of the optical systems such as the polygon mirror and a lens in the respective exposing means, the dispersion of the length of image formed on the image-bearing member in the main scanning direction is produced among the respective exposing means, resulting in producing color deviations.

In such cases as described in the above, it is desirable that the rise timing (phase) and the frequency of the dot clock pulses can be adjusted in a fine mode.

For an abovementioned circuit, which makes it possible to adjust the phase and the frequency, a VCXO (Voltage Controlled Xtal (crystal) Oscillator), a DDS (Digital Direct Synthesizer), etc. have been available.

Although both the VCXO and the DDS are sufficient in accuracy, the VCXO is unsuitable for an application of generating the dot clock pulses due to its narrow adjustable range, while the DDS is also unsuitable for such the application, since the DDS circuit is very expensive and has a difficulty in generating high-frequency dot clock pulses.

Further, when a conventional PLL (Phase Locked Loop) is employed for adjusting clock-pulses in a fine mode, the time constant of the PLL should be set at a large value due to a large number of a dividing ratio, resulting in a problem of long-time clock jitters depending on a frequency-stability of its VCO (Voltage Controlled Oscillator). Incidentally, the term of the abovementioned "long-time clock jitters" is defined as a phenomena in which the frequency of the pulses generated by the VCO gradually deviates within a time interval from feedback to feedback due to the large time constant of the PLL.

Further, in another patent application, the present inventors already disclosed a technology for generating dot clock pulses having a predetermined number of pulses within a predetermined time interval in a constant exposing range of a writing means, in which the period of each clock-pulse is slightly increased or reduced by changing a selection of a plurality of delayed clock pulses, which are generated by delaying clock-pulses outputted from a reference oscillator in slightly different delay times. The disclosed technology allows the apparatus to keep the image length of the scanning line in its main-scanning direction constant.

When employing the abovementioned technology, however, a fluctuation of the clock-period (hereinafter, referred to as a short-time jitter or a jitter) occurs at a point where the period of each clock-pulse is slightly increased or reduced (a time-point at which the selection of the delayed clock pulses is changed), resulting in either a stepwise increase or a stepwise decrease of the period of the dot clock pulses within the time-interval of one scanning line, and resulting in a problem of adversely affecting the image-formation.

Further, in a color image-forming apparatus, the exposing widths on the photoreceptor element are apt to vary with the performance variations of the exposing units each of which corresponds to each of primary colors, the assembling-accuracy variations of the exposing units, etc. Therefore, it is necessary for the writing means for each color to keep a predetermined number of dot clock pulses within a constant exposing range. In addition, it is necessary for a duplex image-forming apparatus to shrink the exposing range for a reverse side of a recording material (recording paper), since the recording material shrinks due to the fixing heat applied for fixing an image previously formed on an obverse side of the recording material.

In the above case, although the both sides of the image can be aligned by keeping a predetermined number of dot clock pulses within a constant exposing range, a color mottling would be generated in the image due to jitters occurred at different points when changing a selection of a plurality of delayed clock pulses at the different points in each color, and/or a density unevenness would be generated in the image since the selected dot clock pulses are used for the pulse width modulation of the image data. As a result, such the color mottling and/or the density unevenness have/has adversely affected to the quality of the reproduced image.

SUMMARY OF THE INVENTION

To overcome the abovementioned drawbacks in conventional image-forming apparatus, it is an object of the present invention to provide image-forming apparatus, in which the influence of the jitters, occurring at the switching point of the clock period, can be suppressed with a simple circuit configuration, when generating dot clock pulses having a predetermined number of reference clock pulses within a predetermined time interval.

Accordingly, to overcome the cited shortcomings, the abovementioned object of the present invention can be attained by circuits and image-forming apparatus described as follow.

(1) A circuit for generating dot clock pulses utilized for an image-forming apparatus having an image-writing section, comprising: a digital-delay dot clock adjusting section to generate first dot clock pulses having a predetermined number of pulses within a predetermined time interval at a constant exposing range of the image-writing section, wherein each period of the first dot clock pulses is slightly increased or reduced by changing a selection for a plurality of delayed clock pulses, which are generated by delaying clock-pulses, outputted from a reference oscillator, in slightly different delay times; and a jitter suppressing section to suppress a jitter component included in the first dot clock pulses, wherein the jitter suppressing section divides the first dot clock pulses to generate second dot clock pulses, and then, multiplies the second dot clock pulses to generate the dot clock pulses.

(2) The circuit of item 1, wherein the jitter suppressing section comprises, a voltage controlled oscillator to generate the second dot clock pulses; a first divider to divide the first dot clock pulses outputted by the digital-delay dot clock adjusting section; a second divider to divide the second dot clock pulses generated by the voltage controlled oscillator; and a phase comparator to perform a frequency-phase comparison between first divided dot clock pulses outputted by the first divider and second divided dot clock pulses outputted by the second divider to output a comparison result voltage, and wherein the phase comparator feedbacks the comparison result voltage to the voltage controlled oscillator so as to constitute a phase locked loop, serving as a flywheel oscillator to disperse the jitter component.

(3) An image-forming apparatus, comprising: an image-bearing member to bear a electrostatic latent image and/or a toner image on it; an image-writing device to scan a surface of the image-bearing member with a scanning-light deflected by a rotating polygon mirror; a modulating section that performs a pulse width modulation or a light-intensity modulation of dot clock pulses in response to image data to generate a scanning-light modulation signal to be fed to the image-writing device; a developing section that develops the electrostatic latent image, formed on the image-bearing member by the scanning-light, to form the toner image as a visual image; a transferring section to transfer the toner image borne on the image-bearing member to a transfer material; a fixing section to fix the toner image, transferred to the transfer material, onto the transfer material; a digital-delay dot clock adjusting section to generate first dot clock pulses having a predetermined number of pulses within a pre-determined time interval at a constant exposing range of the image-writing section, wherein each period of the first dot clock pulses is slightly increased or reduced by changing a selection for a plurality of delayed clock pulses, which are generated by delaying clock-pulses, outputted from a reference oscillator, in slightly different delay times; and a jitter suppressing section to suppress a jitter component included in the first dot clock pulses, wherein the jitter suppressing section divides the first dot clock pulses to generate second dot clock pulses, and then, multiplies the second dot clock pulses to generate the dot clock pulses.

(4) The image-forming apparatus of item 3, wherein the jitter suppressing section comprises, a voltage controlled oscillator to generate the second dot clock pulses; a first divider to divide the first dot clock pulses outputted by the digital-delay dot clock adjusting section; a second divider to divide the second dot clock pulses generated by the voltage controlled oscillator; and a phase comparator to perform a frequency-phase comparison between first divided dot clock pulses outputted by the first divider and second divided dot clock pulses outputted by the second divider to output a comparison result voltage, and wherein the phase comparator feedbacks the comparison result voltage to the voltage controlled oscillator so as to constitute a phase locked loop, serving as a flywheel oscillator to disperse the jitter component.

(5) The image-forming apparatus of item 3, wherein the image-forming apparatus forms a color image based on a plurality of primary colors, and the image-writing device, the digital-delay dot clock adjusting section and the jitter suppressing section are provided corresponding to each of the primary colors.

(6) The image-forming apparatus of item 3, wherein the image-forming apparatus forms an obverse image and a reverse image on both sides of the transfer material, so that a position of the obverse image coincides with a position of the reverse image.

Further, to overcome the abovementioned problems, other clock generating circuit and image-forming apparatus, embodied in the present invention, will be described as follow:

(7) A clock generating circuit, characterized in that, in the clock generating circuit, a digital-delay dot clock adjusting means for generating dot clock pulses having a predetermined number of pulses within a predetermined time interval in a constant exposing range of the writing means by slightly increasing or reducing the period of each clock-pulse by changing a selection of a plurality of delayed clock pulses, which are generated by delaying clock-pulses outputted from a reference oscillator in slightly different delay times, and a jitter suppressing means for suppressing jitters included in the dot clock pulses by dividing dot clock pulses outputted by the digital-delay dot clock adjusting means and multiplying thereafter, are provided.

According to the present invention described in item 7, to generate dot clock pulses having a predetermined number of pulses within a predetermined time interval in a constant exposing range of the writing means, the period of each clock-pulse is slightly increased or reduced by changing a selection of a plurality of delayed clock pulses, which are generated by delaying clock-pulses outputted from a reference oscillator in slightly different delay times. Further, the dot clock pulses, adjusted at a predetermined number of pulses, are divided, and then, the divided dot clock pulses are multiplied to generate dot clock pulses having a desired clock frequency.

In the abovementioned process, although the jitters are generated by slightly increasing or decreasing the period of the dot clock pulses, the dividing operation disperses the influence of the jitters corresponding to the dividing ratio. Further, since the frequency of the divided dot clock pulses, in which the influence of the jitters are suppressed, are multiplied into the desired frequency to generate the desired dot clock pulses, the number of the dot clock pulses is adjusted at the predetermined number, and the influence of the jitters generated during the adjusting operation is reduced corresponding to the dividing ratio.

As a result, in case of generating dot clock pulses having a predetermined number of reference clock pulses within a predetermined time interval, it becomes possible to suppress a influence of jitters occurring at the switching point of the clock period with a simple circuit configuration.

(8) The clock generating circuit recited in item 7, characterized in that, the jitter suppressing means is equipped with a voltage controlled oscillator, a first dividing means for dividing the dot clock pulses outputted by the digital-delay dot clock adjusting means, a second dividing means for dividing the dot clock pulses from the voltage controlled oscillator, and a comparing means for frequency-phase comparing divided results of the first dividing means and the second dividing means to feed the comparison result to the voltage controlled oscillator.

According to the present invention described in item 8, the PLL circuit, including the dividing means, the phase comparing means and the voltage controlled oscillator, is employed for suppressing the jitters mentioned above. In this case, the jitters generated by slightly increasing or reducing the period of each clock-pulse are dispersed and suppressed by the first dividing means, and the voltage controlled oscillator generates dot clock pulses having a desired frequency.

As a result, it becomes possible to suppress the influence of the jitters occurring at the switching point of the clock period with the simple circuit configuration including a combination of the digital-delay dot clock adjusting means and the PLL circuit, while generating dot clock pulses having a predetermined number of reference clock pulses within a predetermined time interval.

(9) An image-forming apparatus, characterized in that, in the image-forming apparatus, which incorporates an image-bearing member to bear a electrostatic latent image and/or a toner image on it; a writing means for scanning a surface of the image-bearing member with a scanning-light deflected by a rotating polygon mirror; a modulating means for generating a scanning-light modulation signal, modulated in a pulse width modulation or a light-intensity modulation by using dot clock pulses to feed the scanning-light modulation signal to the writing means; a developing means for developing the electrostatic latent image, formed on the image-bearing member by the scanning-light, to form the toner image as a visual image; a transferring means for transferring the toner image borne on the image-bearing member to a transfer material; a fixing means for fixing the toner image, transferred to the transfer material, onto the transfer material;

a digital-delay dot clock adjusting means for generating dot clock pulses having a predetermined number of pulses within a predetermined time interval in a constant exposing range of the writing means by slightly increasing or reducing the period of each clock-pulse by changing a selection of a plurality of delayed clock pulses, which are generated by delaying clock-pulses outputted from a reference oscillator in slightly different delay times, and a jitter suppressing means for suppressing jitters included in the dot clock pulses by dividing dot clock pulses outputted by the digital-delay dot clock adjusting means and multiplying thereafter, are provided.

According to the present invention described in item 9, to generate dot clock pulses having a predetermined number of pulses within a predetermined time interval in a constant exposing range of the writing means, the period of each clock-pulse is slightly increased or reduced by changing a selection of a plurality of delayed clock pulses, which are generated by delaying clock-pulses outputted from a reference oscillator in slightly different delay times. Further, the dot clock pulses, adjusted at a predetermined number of pulses, are divided, and then, the divided dot clock pulses are multiplied to generate dot clock pulses having a desired clock frequency.

In the abovementioned process, although the jitters are generated by slightly increasing or decreasing the period of the dot clock pulses, the dividing operation disperses the influence of the jitters corresponding to the dividing ratio. Further, since the frequency of the divided dot clock pulses, in which the influence of the jitters are suppressed, are multiplied into the desired frequency to generate the desired dot clock pulses, the number of the dot clock pulses is adjusted at the predetermined number, and the influence of the jitters generated during the adjusting operation is reduced corresponding to the dividing ratio.

As a result, in case of generating dot clock pulses having a predetermined number of reference clock pulses within a predetermined time interval, it becomes possible to suppress a influence of jitters occurring at the switching point of the clock period with a simple circuit configuration.

(10) The image-forming apparatus recited in item 9, characterized in that, the jitter suppressing means is equipped with a voltage controlled oscillator, a first dividing means for dividing the dot clock pulses outputted by the digital-delay dot clock adjusting means, a second dividing means for dividing the dot clock pulses from the voltage controlled oscillator, and a comparing means for frequency-phase comparing divided results of the first dividing means and the second dividing means to feed the comparison result to the voltage controlled oscillator.

According to the present invention described in item 10, the PLL circuit, including the dividing means, the phase comparing means and the voltage controlled oscillator, is employed for suppressing the jitters mentioned above. In this case, the jitters generated by slightly increasing or reducing the period of each clock-pulse are dispersed and suppressed by the first dividing means, and the voltage controlled oscillator generates dot clock pulses having a desired frequency.

As a result, it becomes possible to suppress the influence of the jitters occurring at the switching point of the clock period with the simple circuit configuration including a combination of the digital-delay dot clock adjusting means and the PLL circuit, while generating dot clock pulses having a predetermined number of reference clock pulses within a predetermined time interval.

In other words, the abovementioned PLL circuit works as a flywheel oscillator, which absorbs instantaneous fluctuations of its inputted signal to output a stable signal having the same frequency as that of the inputted signal. Accordingly, the scope of the circuit applicable to the jitter suppressing means is not limited to the PLL circuit, but a kind of circuit like a flywheel oscillator could be also applied for absorbing the jitters.

(11) The image-forming apparatus recited in item 9 or item 10, characterized in that, the image-forming apparatus forms a color image based on a plurality of primary colors, and the writing means, the digital-delay dot clock adjusting means and the jitter suppressing means are provided corresponding to each of the primary colors.

According to the present invention described in item 11, since the writing means, the digital-delay dot clock adjusting means and the jitter suppressing means are provided corresponding to each of the primary colors, it is possible to prevent a color-image forming apparatus from deteriorating its image quality, such as a color mottle, etc., caused by the jitters.

(12) The image-forming apparatus recited in anyone of items 9–11, characterized in that, a duplex image forming means for forming images on both sides of the transfer material is provided.

According to the present invention described in item 12, since the digital-delay dot clock adjusting means and the jitter suppressing means are provided in the image-forming apparatus for forming a duplex image, it is possible to prevent a color-image forming apparatus from deteriorating its image quality, such as a color mottle, a deviation of printing positions of both sides of the transfer material, an unevenness of density, etc., caused by jitters, which is liable to occur in response to a deviation adjustment between an obverse image and a reverse image.

BRIEF DESCRIPTION OF THE DRAWINGS

Other objects and advantages of the present invention will become apparent upon reading the following detailed description and upon reference to the drawings in which:

FIG. 10 a time chart for explaining a jitter suppressing operation of the image-forming apparatus embodied in the present invention.

DETAILED DESCRIPTION OF THE PREFERRED EMBODIMENT

Figure 1:
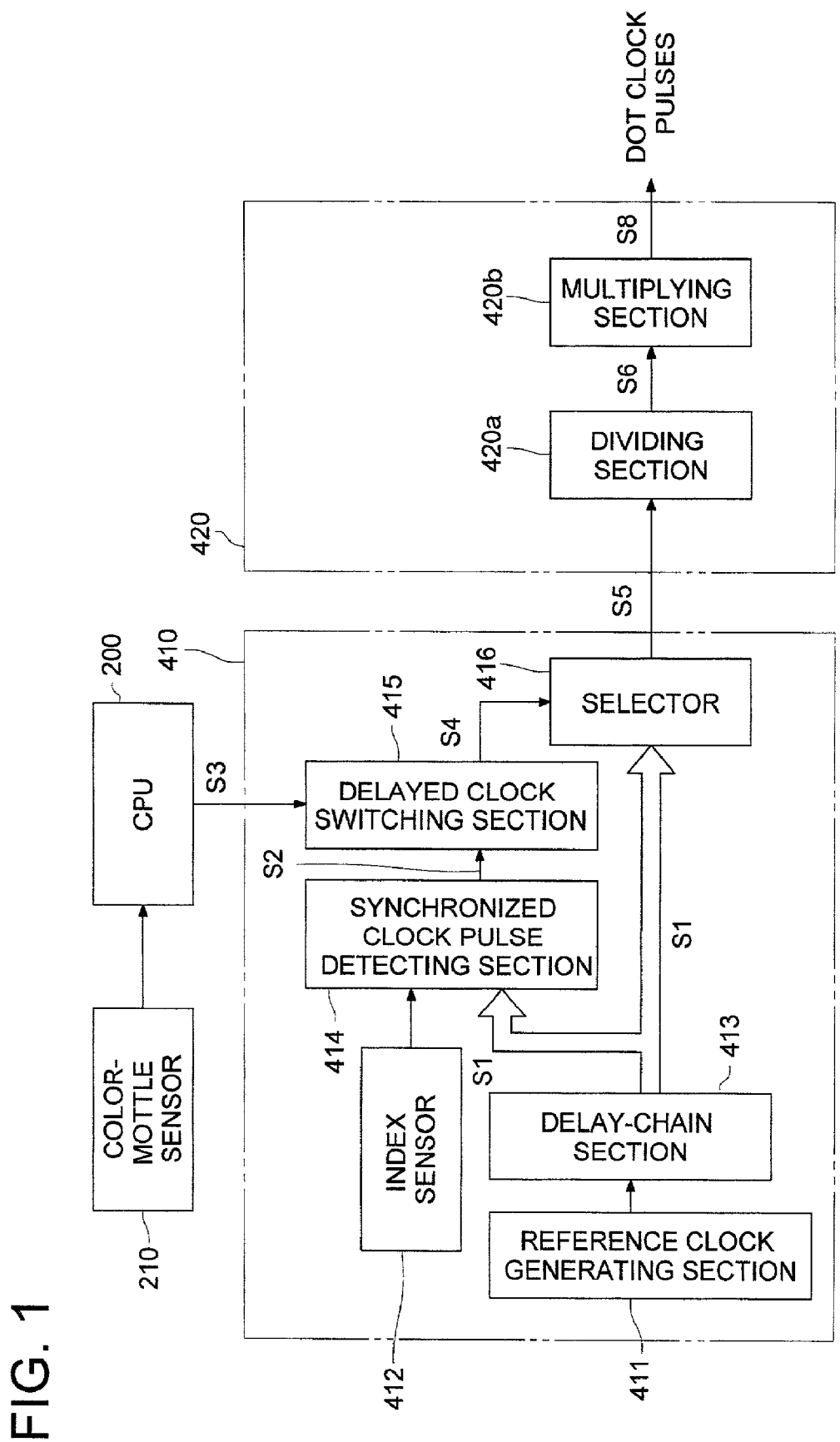
FIG. 1 shows a block diagram of a configuration of a clock-generating circuit embodied in the present invention.

Referring to the drawings, an image-forming apparatus embodied in the present invention will be detailed in the following. Initially, the whole configuration of the image-forming apparatus incorporating the clock generating circuit will be detailed in the following.

(Whole Configuration of the Image-Forming Apparatus)

Figure 2:
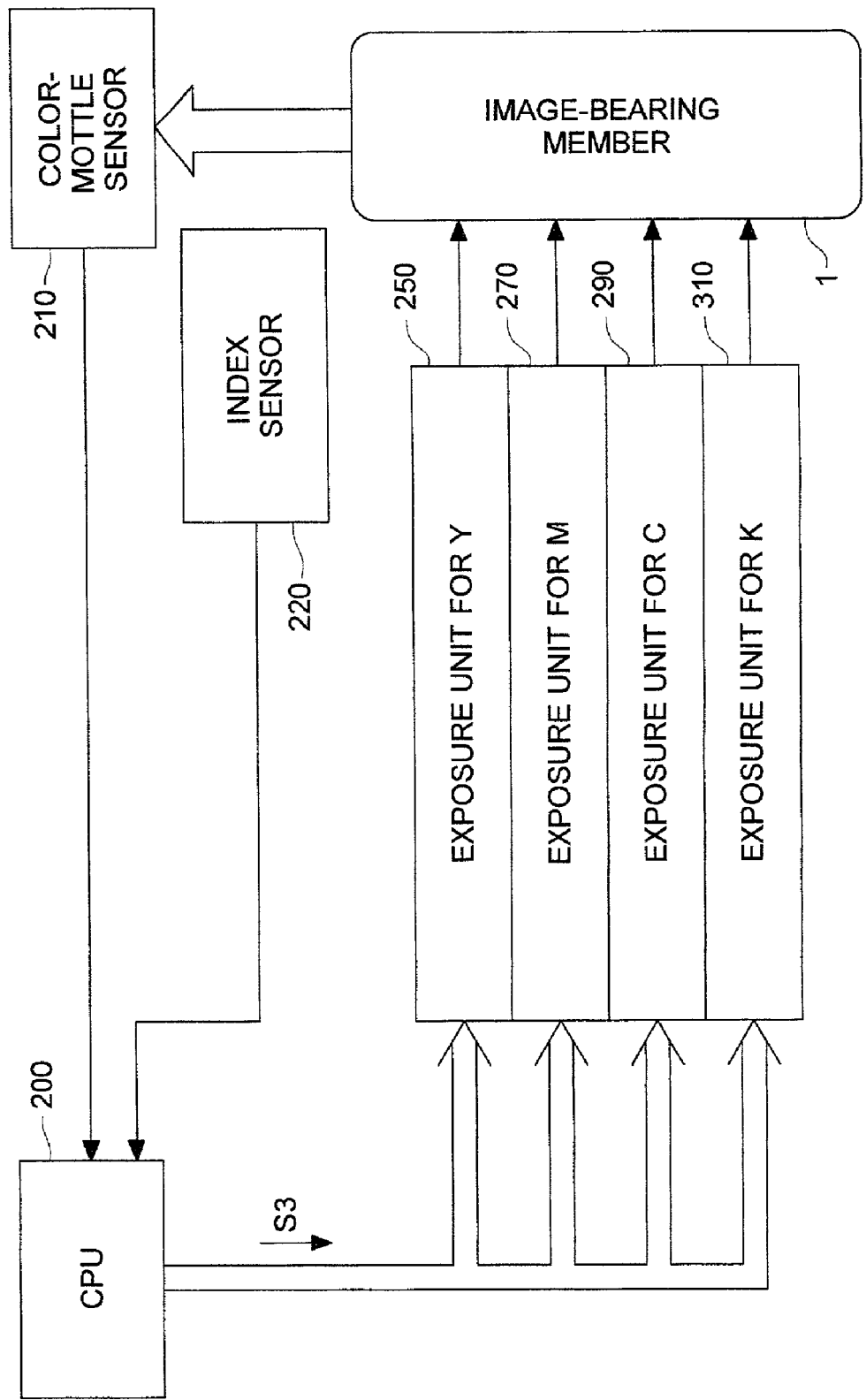
FIG. 2 shows an overall electrical configuration of an image-forming apparatus embodied in the present invention.

FIG. 2 shows the overall electrical configuration of an embodiment of the present invention. Numeral 200 indicates a CPU serving as a control means for generating the dot clock pulses to be described later, numeral 210 indicates a color-mottle sensor for detecting color-deviations by sensing the reflected light from a predetermined image formed on image-bearing member 1, numeral 250 indicates an exposure unit for color Y for reading out image signals in synchronism with the dot clock pulses and for emitting a laser beam modulated in accordance with the signal value of the image signals onto the image-bearing member 1, numeral 270 indicates an exposure unit for color M for reading out an image signal in synchronism with the dot clock pulses and for emitting a laser beam modulated in accordance with the signal value of the image signals onto the image-bearing member 1, numeral 290 indicates an exposure unit for color C for reading out an image signal in synchronism with the dot clock pulses and for emitting a laser beam modulated in accordance with the signal value of the image signals onto the image-bearing member 1, and numeral 310 indicates an exposure unit for color K for reading out an image signal in synchronism with the dot clock pulses and for emitting a laser beam modulated in accordance with the signal value of the image signals onto the image-bearing member 1. Incidentally, the clock-generating circuit embodied in the present invention is equipped in each of the exposure units for colors Y, M, C, K.

(Whole Mechanical Configuration of the Image-Forming Apparatus)

Figure 3:
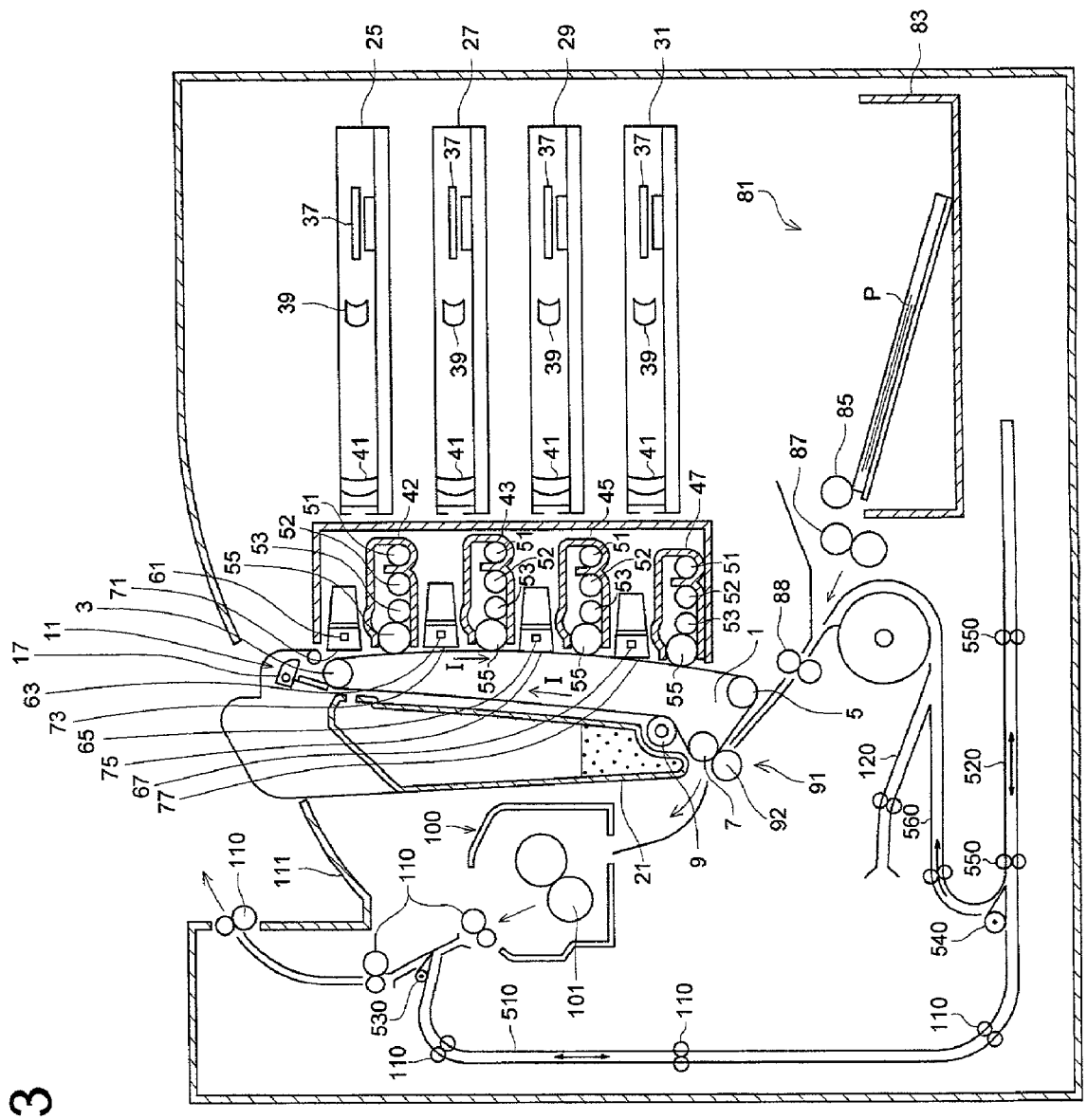
FIG. 3 shows a mechanical configuration of a color image-forming apparatus, for which the clock-generating circuit and the image-forming apparatus, embodied in the present invention, can be applied.

FIG. 3 shows a mechanical configuration of a color image-forming apparatus, for which the clock-generating circuit and the image-forming apparatus, embodied in the present invention, can be applied. Referring to FIG. 3, the whole configuration of the color image-forming apparatus will be detailed in the following.

Incidentally, the above embodiment is a multi-color image forming apparatus, and it is taken for instance herein the color image forming apparatus using toners of four colors, namely, Y (yellow), M (magenta), C (cyan), and K (black).

First, the image-bearing member (photoreceptor) 1 of an endless belt shape, entrained around the upper roller 3, the lower roller 5, and the side roller 7, is extended in the upward and downward direction by the upper roller 3 and the lower roller 5, and is driven in the direction of the arrow marks I. Further, on the surface of the portion of the image-bearing member 1 moving from down to up, the pressing roller 9 as a guide means for guiding the image-bearing member 1 to the direction of a closed space formed by the image-bearing member 1 by pressing it to the direction of the closed space.

At the upper portion of the surface of the portion of the image-bearing member 1, which is moving from down to up, there is provided the cleaning means 11 which is in rubbing contact with the image-bearing member 1 and removes the toner particles on the image-bearing member 1. Under the cleaning means 11 along the image-bearing member 1, there is provided the recovery box 21 as a collecting means for collecting the toner particles removed by the cleaning means 11.

In the following, the explanation of the latent image forming means for forming a latent image on the image-bearing member 1 will be given. The image forming apparatus of this example of the embodiment is a four-color image forming apparatus, and accordingly it has four means for forming a latent image corresponding to the respective colors. That is, they are the optical writing section for Y 25 which forms a latent image for Y (yellow) using a laser beam on the image-bearing member 1, the optical writing section for M 27 which forms a latent image for M (magenta) using a laser beam on the image-bearing member 1, the optical writing section for C 29 which forms a latent image for C (cyan) using a laser beam on the image-bearing member 1, and the optical writing section for K 31 which forms a latent image for K (black) using a laser beam on the image-bearing member 1.

Next, the developing units will be explained. Four developing units for developing the latent images for the respective colors, which have been formed on the image-bearing member 1, are provided. That is, they are the developing unit for Y 42 for developing the latent image which has been formed by the optical writing section for Y 25, the developing unit for M 43 for developing the latent image which has been formed by the optical writing section for M 27, the developing unit for C 45 for developing the latent image which has been formed by the optical writing section for C 29, and the developing unit for K 47 for developing the latent image which has been formed by the optical writing section for K 31.

Further, corresponding to the developing units for the respective colors 42, 43, 45, and 47, the charging electrodes of the charging means for giving charge to the image-bearing member 1 are provided. That is, they are the charging electrode for Y 61, the charging electrode for M 63, the charging electrode for C 65, and the charging electrode for K 67. Besides, the charging means for the respective colors of this example of the embodiment comprise the grids 71, 73, 75, and 77 respectively for controlling the charged electric potential on the image-bearing member 1.

Numeral 81 indicates a paper feeding section, which is equipped with the cassette 83 receiving the transfer paper P serving as a transfer material. The transfer paper P in the cassette 83 is conveyed out by the conveying-out roller 85, is transported by the transport roller pair 87 and the registration roller 88, being held between them, and is fed to the transfer means 91. At the transfer means 91, there is provided the transfer roller 92 which is kept at an electric potential of the opposite polarity to the image-bearing member 1; this transfer roller 92 is disposed in such a manner as to hold the image-bearing member 1 between it and the cooperating side roller 7.

Numeral 100 indicates a fixing section for fusing the toner particles to the transfer paper P by applying heat and pressure to the transfer paper P with the pair of heat rollers 101 pressed to keep the paper between them, and numeral 110 indicates a pair of transport rollers which transports the transfer paper P having been subjected to heat fixing to the receiving tray 111, with the paper held between them. Further, numeral 120 indicates a paper transport path on which the transfer paper P of a different size fed from a paper feeding section provided outside the apparatus is transported.

In the following, the overall operation of the image forming apparatus of the above-described configuration will be explained. When the image-bearing member 1 is driven in the direction of the arrow marks I, the surface potential of the image-bearing member 1 is made to reach to a predetermined value by the charging means for Y composed of the charging electrode 61 and the grid 71. Next, a latent image is formed on the image-bearing member 1 by the optical writing means for Y 25. Then, toner particles in the developer carried on the developing sleeve 55 of the developing unit for Y 42 are removed onto the image-bearing member 1 by Coulomb's force, to form a toner image on the image-bearing member 1. The same operation as the above is performed for the rest of colors, namely, M, C, and K, and toner images of Y, M, C, and K are formed on the image-bearing member 1.

On the other hand, from the paper feeding section 81, the transfer paper P is fed toward the transfer means 91 by the conveying-out roller 85 and the transport roller pair 87. The fed transfer paper P is adjusted for its timing against the toner images on the image-bearing member 1 to be in synchronism with them and fed to the transfer means 91 by the registration roller 88; then, it is charged by the transfer roller 92 of the transfer means 91, and the toner images on the image-bearing member 1 is transferred onto the transfer paper P. Next, the transfer paper P is heated and pressed in the fixing section 100, with the toner images fused on it, and is ejected onto the receiving tray 111 by the pair of transport roller 110. On the other hand, the residual toner particles after transfer on the image-bearing member 1 are removed by the blade 17 of the cleaning means 11, and are stored in the collection box 21. Incidentally, the image-forming mode mentioned above is a one side image-forming mode in which the image is formed on only an obverse side of the transfer paper P and first gate flip 530, detailed later, is always switched so as to open the paper-feeding path towards the receiving tray 111.

Next, the duplex image-forming mode will be detailed in the following.

Numeral 510 indicates a first return path of the transfer paper P, numeral 530 indicates a first gate flip to switch the paper-feeding path, numeral 540 indicates a second gate flip to switch the paper-feeding path, numeral 520 indicates a second return path of the transfer paper P, numeral 550 indicates a paper-driving roller pair to move the transfer paper P in both forward and reverse directions, numeral 520 indicates a second return path of the transfer paper P, and numeral 560 indicates a third return path of the transfer paper P.

In the duplex image-forming mode, since the first gate flip 530 is switched so as to open the paper-feeding path towards the first return path 510 and the second gate flip 540 is switched so as to open the paper-feeding path towards the second return path 520 when the color image is formed and fixed on the obverse side of the transfer paper P, the transfer paper P, having the color image on its obverse side, is fed into the first return path 510 by the pair of transport roller 110 and further fed into the second return path 520 by forward-driving action of the paper-driving roller pair 550. When a sensor (not shown in the drawings), disposed near the paper-driving roller pair 550, detects the trailing edge of the transfer paper P, the paper-driving roller pair 550 stops its forward-driving action and the second gate flip 540 is switched so as to open the paper-feeding path towards the third return path 560. Then, the paper-driving roller pair 550 starts its reverse-driving action so as to feed the transfer paper P to the registration roller 88. Successively, in the same process as that for forming the color image of the obverse side, another color image is formed and fixed on the reverse side of the transfer paper P, and finally, the transfer paper P having the duplex image is ejected onto the receiving tray 111 by the pair of transport roller 110.

(Optical Configuration of the Image-Forming Apparatus)

Figure 4:
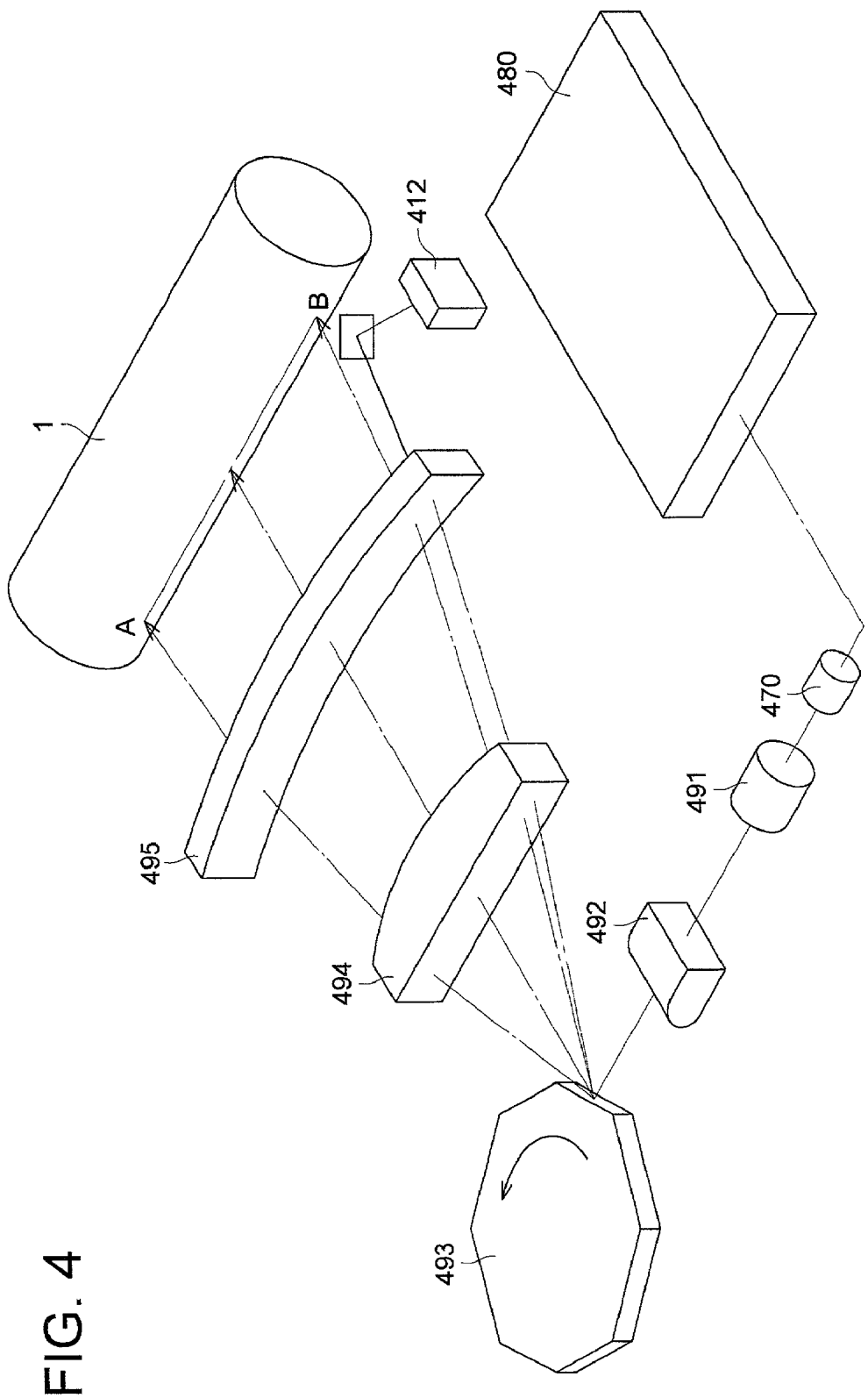
FIG. 4 shows a perspective view of a configuration of an optical writing section, serving as a main section of the image-forming apparatus embodied in the present invention.

Incidentally, the configuration of the optical writing section is as shown in FIG. 4. That is, the laser diode 470 emits light on the basis of the signals generated in the circuit section 480. Then, the laser beam, emitted by the laser diode 470 and having been passed through the collimator lens 491 and the cylindrical lens 492, is deflected for scanning by the polygonal mirror 493, and scans the image-bearing member 1 for writing after passing through the fθ lens 494 and the cylindrical lens 495. In addition, a part of the laser beam deflected by the polygonal mirror is led to the index sensor 412 for detecting the timing.

(Detailed Configuration of the Image-Forming Apparatus)

The embodiment of image-forming apparatus of the present invention will be detailed in the following.

FIG. 1 shows a block diagram of the configuration of the clock-generating circuit, which is incorporated in each of the exposure units 250, 270, 290, 310 respectively corresponding to colors Y, M, C, K, with CPU 200 and other blocks. Incidentally, although only a single clock-generating circuit is indicated in FIG. 1, four clock-generating circuits, each of which has the same configuration as that indicated in FIG. 1 and corresponds to each of four colors Y, M, C, K, are provided in the real image-forming apparatus.

As shown in FIG. 1, the clock-generating circuit can be roughly divided into two sections, namely, the dot clock-generating section 410 and the jitter-suppressing section 420, which will be successively detailed in the following.

The dot clock-generating section 410, serving as a dot clock adjusting means, is constructed as follow. The first delay-chain section 413 is a group of delay elements for delaying the inputted signal (the reference clock signal outputted from the reference clock generating section 411) to obtain a plurality of delayed clock signals (a first delayed-signal group: S1 in FIG. 1), phases of which are slightly different relative to each other.

Incidentally, in the first delay-chain section 413, it is desirable that the delay elements are cascaded as a chain in such a number of stages that the delayed clock signals, phases of which are slightly different relative to each other, can be formed over two period of the reference clock.

Further, it is applicable that the reference clock generating section 411 is incorporated in each clock generating circuit for each color, or it is also applicable that reference clock signals are distributed to each of the clock generating circuits from reference clock generating section 411, serving as a single clock generating section.

Still further, as shown in FIG. 4, the index sensor 412 is utilized for detecting a reference position of the laser-beam scanning. The synchronized clock pulse detecting section 414 receives a signal detected by the index sensor 412 and detects the stage number (synchronizing point) of the delayed clock pulse, which is synchronized with the index signal out of the first delayed-signal group (S1 in FIG. 1), to output the synchronizing point information (S2 in FIG. 1).

Incidentally, it is desirable that the synchronized clock pulse detecting section 414 can output the first synchronizing point information SP1 at which synchronization with the index signal initially occurs and the second synchronizing point information SP2 at which synchronization with the index signal secondly occurs, among the first delayed-signal group (S1 in FIG. 1).

The delayed clock switching section 415 finds a synchronized compensation amount on the basis of the synchronizing point information (S2 in FIG. 1) outputted by synchronized clock pulse detecting section 414 and the frequency-deviation information outputted by CPU 200, and outputs a selecting signal (S4 in FIG. 1) to select a delayed clock having a suitable phase out of the first delayed-signal group (S1 in FIG. 1). Incidentally, the frequency-deviation information will be detailed later on.

Then, the selector 416 receives the selecting signal sent from delayed clock switching section 415 (S4 in FIG. 1) to select a delayed clock having a corresponding phase, and outputs the selected delayed clock serving as the dot clock pulses (S5 in FIG. 1).

Accordingly, in the abovementioned embodiment, the dot clock pulses having a predetermined number of pulses within a predetermined time interval are generated by slightly increasing or decreasing periods of the dot clock pulses. In other words, instead of applying a fine adjustment to the clock frequency, a number of dot clock pulses within a predetermined time interval is adjusted at a predetermined number in such a manner that delayed clock signals, phases of which are slightly and gradually changed relative to each other, are successively selected within a predetermined time interval without changing the clock frequency itself.

Further, the jitter-suppressing section 420 is constructed as follow. The dividing section 420*a* divides the dot clock pulses (S5 in FIG. 1) at a predetermined dividing ratio, while the multiplying section 420*b* multiplies the divided dot clock pulses (S6 in FIG. 1) up to the desired frequency. Then, the multiplied dot clock pulses are fed to the external PWM (Pulse Width Modulation) circuit (not shown in the drawings) and other circuits.

(Deviation Detecting Principle for Adjusting the Dot Clock Pulses)

Figure 5:
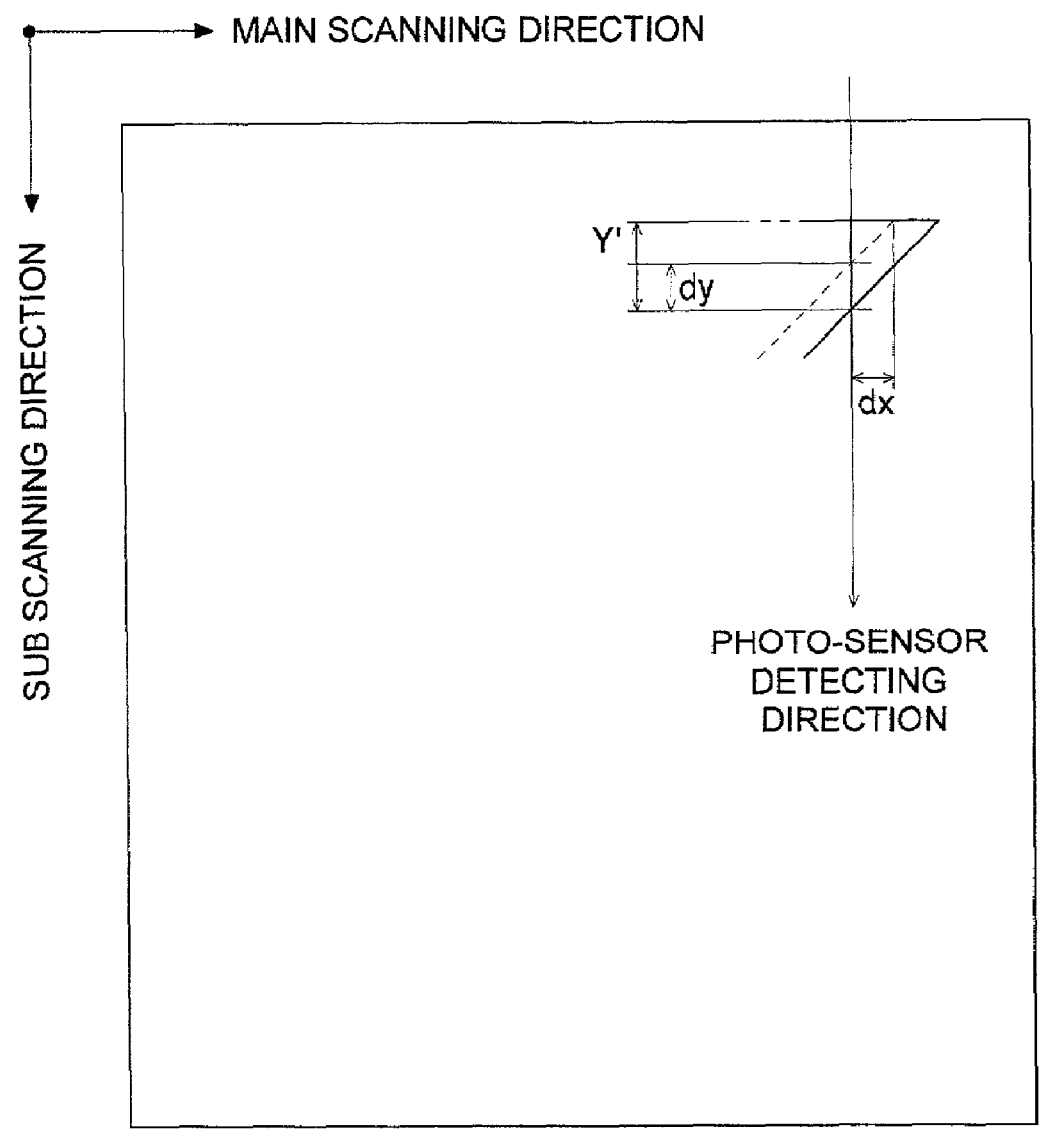
FIG. 5 shows a explanatory illustration for explaining a detection of deviation.

Now, with reference to FIG. 5, how deviation is detected will be simply explained. An image of a predetermined pattern (here, a pattern made up of a folded line composed of a horizontal line and an oblique line making an acute angle with the former) is formed at the leading end side on the image-bearing member 1 by the exposure units 250, 270, 290, and 310. A pattern indicated by the solid lines has been actually formed on the image-bearing member, but if it is properly formed, a pattern indicated by the broken line is expected.

Here, a deviation of dx is produced in a main scanning direction due to deviations in the exposure units, aberrations of the lenses in the optical systems etc. In this case, by performing the sensing by the color-mottle sensor 210 disposed at a position capable of sensing the pattern with the image-bearing member moved in the direction of sub-scanning, the time interval for sensing corresponding to the distance Y' from the horizontal line to the oblique line of the predetermined pattern can be obtained.

The difference dy between the distance Y' and the distance Y0, which is the distance between the horizontal line and the oblique broken line can be obtained from the moving velocity of the image-bearing member in the direction of sub-scanning and the difference between the sensing time interval for the horizontal line and the oblique line indicated by the solid lines and the theoretical time interval corresponding to the broken lines. Next, let θ be the angle made by the horizontal line and the oblique line, then the deviation dx in the direction of main scanning can be obtained by the following equation:

$$dx = dy/\tan\theta.$$

Accordingly, by performing the formation of the predetermined pattern and the sensing of it for the respective colors Y, M, C, and K, it becomes possible for CPU 200 to detect the state of deviation concerning the expansion and contraction of an image in the direction of main scanning (frequency deviation information).

Incidentally, although only one predetermined pattern is indicated in FIG. 5, two predetermined patterns should be formed in the real application.

Further, by forming the predetermined pattern of the same shape as the above at each of the leading end and the trailing end in the main scanning direction on the same sub-scanning position and measuring the distance between them, the state of deviation concerning the expansion and contraction of an image in the main scanning direction (frequency deviation information) can be detected.

Thus, the CPU 200 performs such processing as this and supplies the frequency deviation information (S3 in FIG. 1, S3 in FIG. 2) to the exposure units.

Incidentally, as well as the above, it is also possible that CPU 200 detects the predetermined pattern at the leading end in the main scanning direction to find the image leading end deviation information in respect to the starting position of the image in the main scanning direction, and supplies the detected image leading end deviation information to the exposure units.

(Operating of the Image-Forming Apparatus)

The operations of the image-forming apparatus, embodied in the present invention, will be detailed in the following. Herein, the explanation will be given taking it for instance a case wherein it is applied to an image forming apparatus making the image formation of four colors Y, M, C, and K.

Further, the image forming apparatus using the image-forming apparatus of this example of the embodiment is equipped with the exposure unit for Y 250, the exposure unit for M 270, the exposure unit for C 290, and the exposure unit for K 310; hence, the following correspond to this: an apparatus which forms a four-color image during one rotation of a belt-shaped image-bearing member, an apparatus which is equipped with exposure units and photoreceptor drums for the colors Y, M, C, and K respectively and carries out image forming during a single passing through of a recording paper, and so forth.

That is, the image-forming apparatus of this invention can be applied to any one of various kinds of image forming apparatus if only it is equipped with a plurality of exposure units and has a possibility of producing a color deviation even by using the same basic clock pulse for the exposure units.

(Dot Clock Adjusting Operation in Digital Delay Method)

First, with reference to the time chart in FIG. 6, with regard to an arbitrary color taken for instance, it will be explained up to a point where the dot clock pulse is generated, an operation for an adjustment such that, with reference to the frequency deviation information, the number of pulses is made to be a predetermined number by using delayed clock pulses having different phases respectively from one another for each pulse, and also the time during which this predetermined number of pulses are generated is made to be a predetermined amount of time.

Frequency deviation information indicating the frequency deviation ER detected by the above described formation of the predetermined pattern and sensing, clock pulse period information of the clock pulse frequency TC to be obtained from the frequency of the basic clock pulse, and number-of-pixels per line information indicating the number of pixels to be formed in the direction of main scanning are given to the correction value calculating means in the delayed clock switching section 415 from the CPU 200. Further, from the first synchronizing point information SP1 and the second synchronizing point information SP2 from the synchronized clock pulse detecting section 414, the number of stages for a period NS (equivalent to a number of stages for obtaining a delay time equivalent to one period of the reference clock) is obtained.

Now, the correction value calculating means in the delayed clock switching section 415 obtains the correction count value (count load data) CC corresponding to the correction value on the basis of the equation shown in the following:

$$CC = PH \times (NS/TC)/ER \qquad (1).$$

This correction count value CC is obtained for the purpose that the switching count means in the delayed clock switching section 415 counts down the number of pulses and makes the switching-over of the upper rank select signal and the switching-over of the lower rank select signal. Accordingly, the correction value CC for switching over becomes smaller as the correction value becomes larger.

Further, with reference to the rise-up of the index signal from the index sensor 412, the synchronized clock pulse detecting section 414 obtains the stage number of the first delay-chain section 413 at which a delayed clock pulse synchronized with this rise-up of the index signal is obtained as the synchronizing point information.

Here, suppose that the first synchronizing point information SP1 is obtained as 20, and the second synchronizing point information SP2 is obtained as 50. Thus, in this case, the above-described number of stages for a period NS is 30.

Figure 6:
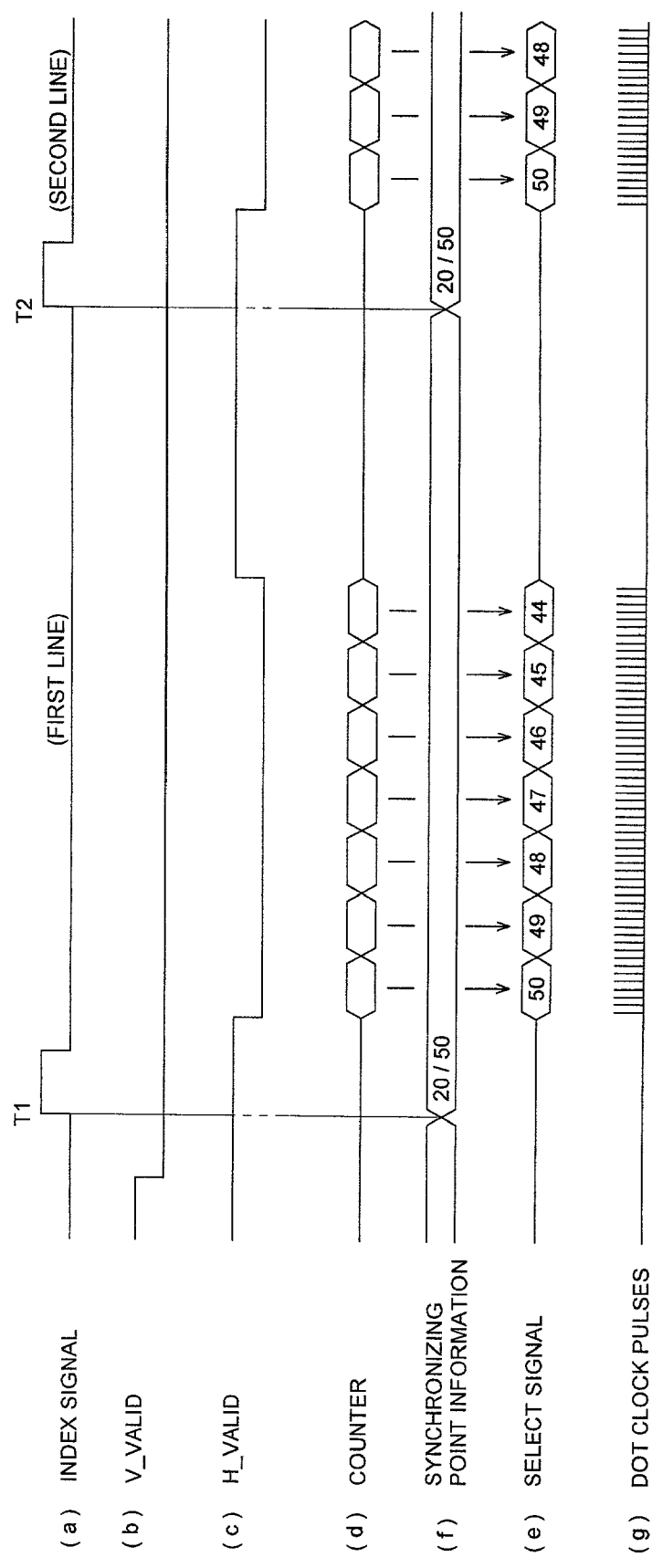
FIG. 6 shows a time chart for explaining an operating mode of the image-forming apparatus embodied in the present invention.

Now, by the scanning by the laser beam of the exposure unit, the index sensor generates the index signal at the timing when it detects the laser beam (T1 in FIG. 6(*a*)). After this, H_VALID indicating the effective area in the horizontal direction becomes active.

Then, the switching count means in the delayed clock switching section 415 continues to count down repeatedly the aforesaid correction count value CC in accordance with the basic clock pulse. Further, every time when the count value becomes zero by counting down, it gives the count data as an interrupting signal to the select signal operating means 443 in the delayed clock switching section 415 ((d) to (f) in FIG. 6).

Further, the CPU 200 gives deviation direction information to the select signal operating means 443 in the delayed clock switching section 415; it gives {−correction} information for making a correction to give contraction against the deviation expanding in the main scanning direction, and it gives {+correction} information for making a correction to give expansion against the contraction in the main scanning direction. Here, the case of {−correction} is taken for instance.

It is assumed that the frequency deviation information ER and the deviation direction information have been obtained by the above-described formation of the predetermined pattern and its measurement. Here, suppose that ER is 6 ns and the deviation direction information={−correction}, that is, it indicates that correction to give contraction against the expanded image should be made.

First, the synchronized clock pulse detecting section 414 obtains the first synchronizing point information SP1 and the second synchronizing point information SP2 with reference to the rise-up of the index signal from the index sensor 412.

The aforesaid first synchronizing point information SP1 indicates the stage number of the delay element of the first delay-chain section 413, which is in synchronism with the rise-up of the index signal, and the aforesaid second synchronizing point information SP2 indicates the stage number of the delay element of the first delay-chain section 413 which is delayed by one period of the basic clock pulse from said first synchronizing point information SP1.

Figure 7:
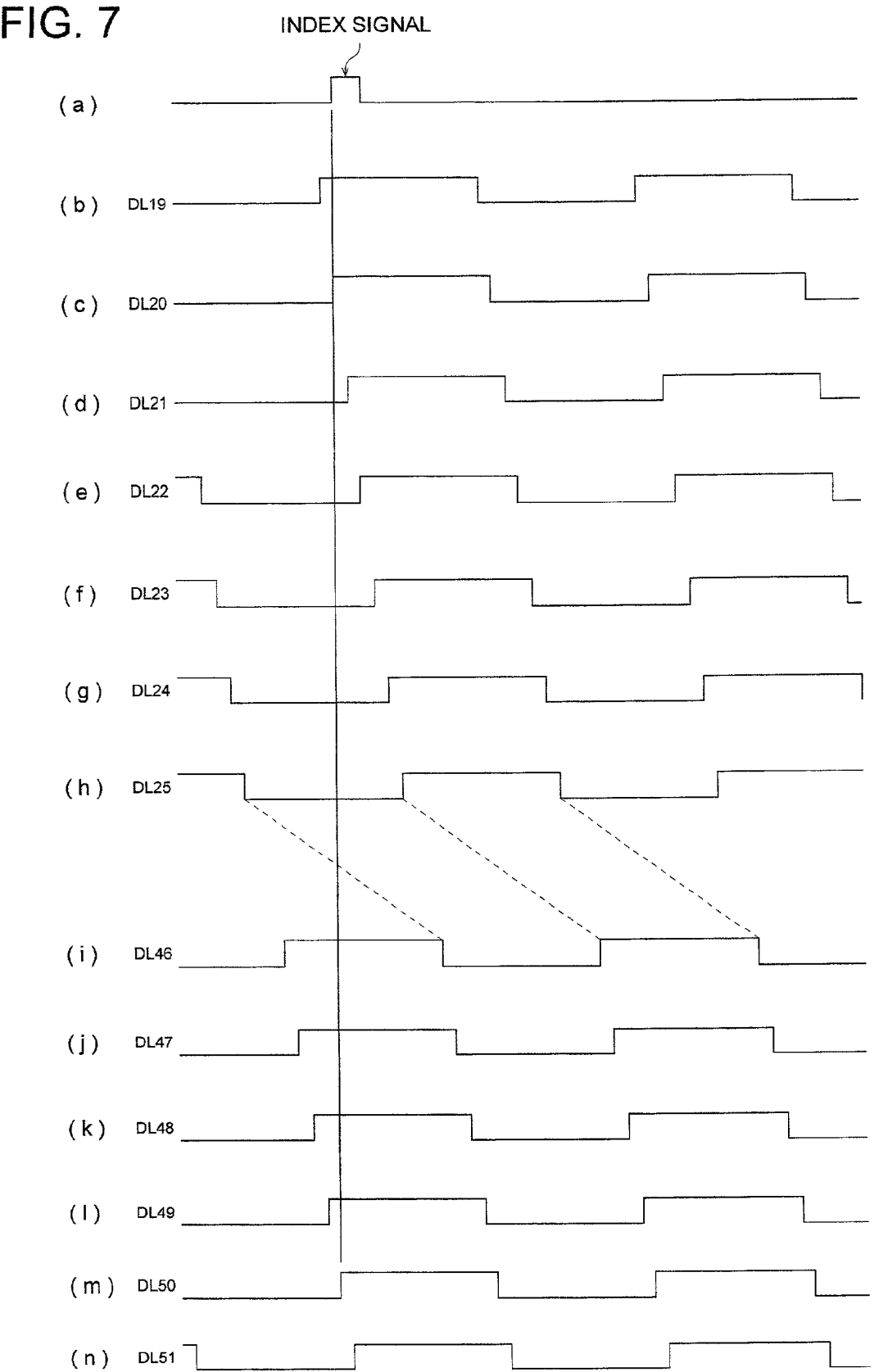
FIG. 7 shows a time chart for explaining an operating mode of the image-forming apparatus embodied in the present invention.

Here, assume that SP1=20, and SP2=50. Further, this condition is indicated in FIG. 7. In this drawing, it is indicated the state that the DL20 of which the stage number is 20 ((c) in FIG. 7) and the DL50 of which the stage number is 50 ((m) in FIG. 7) delayed by one period of clock pulse from the LD20 are in synchronism with the rise-up of the index signal ((a) in FIG. 7).

Next, the number of the stages for a period NS is obtained from the aforesaid first synchronizing point information SP1 and the aforesaid second synchronizing point information SP2. Now, said number of stages for a period NS indicates the number of stages between the delay elements, the delay time difference between which is equal to the time for one period of the basic clock pulse. In this example of the embodiment, the number of stages for a period NS=30 is obtained from the equation NS=SP2−SP1.

Further, the delay time per stage of the delay elements DT is obtained from the aforesaid NS and the period of the basic clock pulse. For example, if the period of the basic clock pulse TC is 30 ns, by using NS=30, DT=1 ns is obtained from the equation DT=TC/NS. Since the delay time per stage of the delay elements varies depending on the temperature condition of the integrated circuit, the fluctuation of the voltage of the power source supplied to the integrated circuit etc., it is to be considered that it becomes 1.5 ns in one case, and it becomes 0.5 ns in another case. However, because the frequency of the basic clock pulse does not vary, the delay time per stage of the delay elements at the time of measurement can be obtained precisely by obtaining the number of stages of the delay elements for a cycle period NS.

Then, the number of switching-over NC indicating the number of stages of the delay elements in the first delay chain section corresponding to the amount of time by which the phase of the dot clock pulse is to be shifted finally for the purpose of obtaining a proper image signal is obtained from the frequency deviation information ER, deviation direction information, and the delay time DT. Here, the number of switching-over NC=−6 is obtained from the equations ER=6 ns, the deviation direction information={−correction}, and DT=1 ns.

In order to obtain a proper image signal from the above-mentioned number of switching-over NC, it is appropriate to advance the stage number of the delay elements by six before the end of the scan line. That is, it is to the purpose that, in synchronism with the rise-up of the index signal, the delayed clock pulse from the delay element of the fiftieth stage is employed at first, and after that, in synchronism with the upper rank select signal within one scan line, the delayed clock pulses from the delay element of the forty ninth stage, of the forty eighth stage, of the forty seventh stage, of the forty sixth stage, of the forty fifth stage are successively substituted for the former one to be employed, and finally the delayed clock pulse from the delay element of the forty fourth stage is employed.

Further, if the number of switching-over is larger than the number of stages per period, it is appropriate to circulate the upper rank select signal. In the above-described example, in the {−correction} case where SP1=20, SP2=50, and the number of stages per period is 30, at the timing when the upper rank select signal becomes 20, having been varied stepwise as 50, 49, - - - , 21, 20, it is appropriate to make it next 49, then to vary it stepwise to 48, - - - , because the upper rank select signal 20 and the upper rank select signal 50 are of the same phase. That is, the upper rank select signal is made to be 50, 49, - - - , 21, 20 (=50), 49, 48, - - - . In addition, in the same way also in the {+correction} case, the select signal may be circulated.

Further, in the case where the {−correction} is made in such a manner as to be varied stepwise every four stages like 50, 46, 42, - - - , 22, 18, it exceeds the SP1=20; then, next to 18, it is made to be 50−(20−19)−3=46. That is, by making it be in the state of being added by an amount exceeding the synchronizing point and one correction value for continuing to circulate, the circulation can be done without problem.

In the selector 416 having received such an upper rank select signal as this, the delayed clock pulses from the fiftieth stage, from the forty ninth stage, from the forty eighth stage, from the forty seventh stage, - - - are selected out of the first group of delayed clock pulses (S1 in FIG. 9) from the first delay-chain section 413, and each of them is outputted as dot clock pulses ((g) in FIG. 6).

In this case, by selecting the delayed clock pulses from the fiftieth stage, from the forty ninth stage, from the forty eighth stage, from the forty seventh stage, - - - out of the group of delayed clock pulses, at first the delayed clock pulse (the delayed clock pulse from the fiftieth stage) synchronized with the index signal is obtained, and the delayed clock pulses (from the forty ninth stage, from the forty eighth stage, from the forty seventh stage) of a little shorter delay (with an advanced phase) is successively periodically obtained one after another within a single scanning line. As a result of this, the {−correction} is actualized and such a correction as to finally contract the deviation expanding in the main scanning direction by 6 ns is carried out.

Further, in the {+correction} case, with the first synchronizing point information SP1 made to be the initial value, by selecting the delayed clock pulses from the twentieth stage, from the twenty first stage, from the twenty second stage, from the twenty third stage, - - - , out of the first delayed-signal group (S1 in FIG. 1), at first the delayed clock pulse (from the twentieth stage) synchronized with the index signal is obtained, and successively the delayed clock pulses (from the twenty first stage, from the twenty second stage, from the twenty third stage, - - - ) of a little longer delay (with a retarded phase) one after another. As a result of this, the {+correction} is actualized and such a correction as to finally expand the deviation contracting a scanning line in the main scanning direction is carried out.

That is, with reference to the frequency deviation information, it can be performed an adjustment such that the number of pulses of a dot clock pulse in a single scanning line is made to be a predetermined number by shifting the delayed clock pulse to be used as the dot clock pulse successively every certain amount of time, and also the time period during which the above-mentioned predetermined number of pulses are generated is made to be a predetermined time.

Further, since the controlling operation based on the frequency deviation information is performed in the above-mentioned correction, the length of the image in respect to the main scanning direction can be accurately adjusted.

Figure 8:
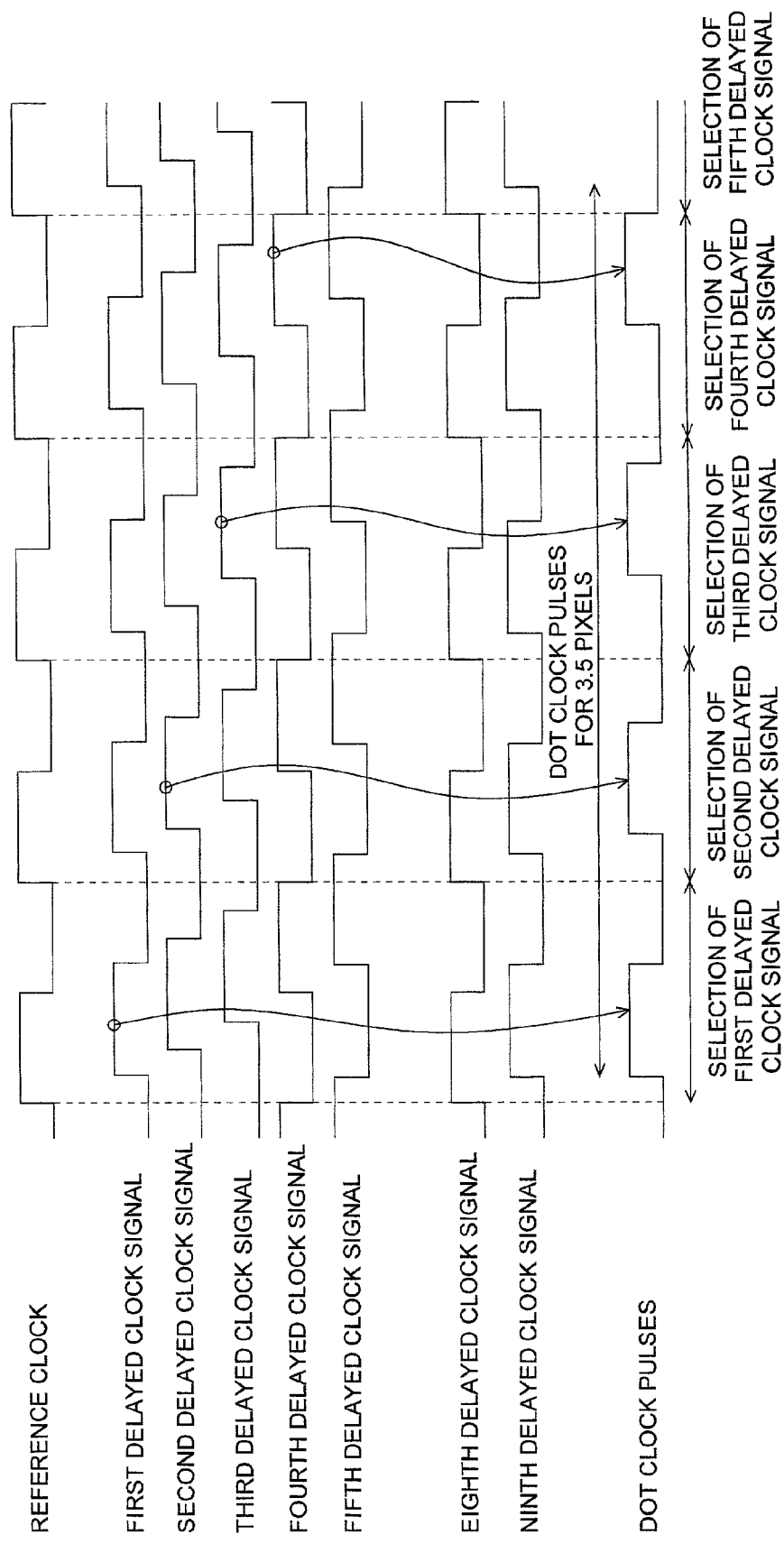
FIG. 8 shows a time chart for explaining an operating mode of the image-forming apparatus embodied in the present invention.

Incidentally, FIG. 8 shows a timing chart of delayed clock pulses, illustrating a relationship between them in the expansion/contraction correction mode in the main scanning direction (namely, the main scanning magnification compensation). In FIG. 8, a reference clock, delayed clock signals (a first delayed clock signal to ninth delayed clock signal) and dot clock pulses are indicated.

In case shown in FIG. 8, when sequentially selecting the first delayed clock signal, the second delayed clock signal, the third delayed clock signal, the fourth delayed clock signal and the fifth delayed clock signal within four periods of the reference clock, 3.5 dot clock pulses reside within the four periods. In other words, since 3.5/4=87.5%, the controlling action is to actually lower the frequency of the dot clock pulses. Incidentally, even if another selecting method is conducted, the same result as the above would be obtained.

Further, since the phase of the eighth delayed clock signal coincides with that of the reference clock in the case shown in FIG. 8, when sequentially selecting the eighth delayed clock signal, the seventh delayed clock signal, the sixth delayed clock signal, the fifth delayed clock signal and the fourth delayed clock signal within four periods of the reference clock, 4.5 dot clock pulses reside within the four periods (not shown in the drawings). In other words, since 4.5/4=112.5%, the controlling action is to actually raise the frequency of the dot clock pulses. Incidentally, even if another selecting method is conducted, the same result as the above would be obtained.

(Operations for Suppressing Jitters)

On the other hand, when the dot clock pulses generated by the abovementioned method is employed, since the period of the clock varies at the time point at which the selection of the delayed clock is changed, the jitters occur at the time point, though the lengths in the main scanning direction can be aligned. In the example shown in FIG. 6, the jitters occur at six time points, at each of which the selecting signal is switched, (including transitions from 50 to 49, from 49 to 48, from 48 to 47, from 47 to 46, from 46 to 45 and from 45 to 44).

To suppress the jitters mentioned above, in the jitter-suppressing section 420, the dot clock pulses are divided, and then, the divided dot clock pulses (S6 in FIG. 1) are further multiplied in order to generate the multiplied dot clock pulses (SB in FIG. 1) having a desired frequency.

In other words, the operation for dividing the dot clock pulses allows dispersing the jitter-components into the wide pulse-width of the divided dot clock pulses, and further, the operation for multiplying the dot clock pulses allows dispersing the jitter-components. Accordingly, it becomes possible to disperse the influence of the jitters corresponding to the dividing ratio and to suppress the amplitude of the jitters corresponding to the dividing ratio.

Figure 9:
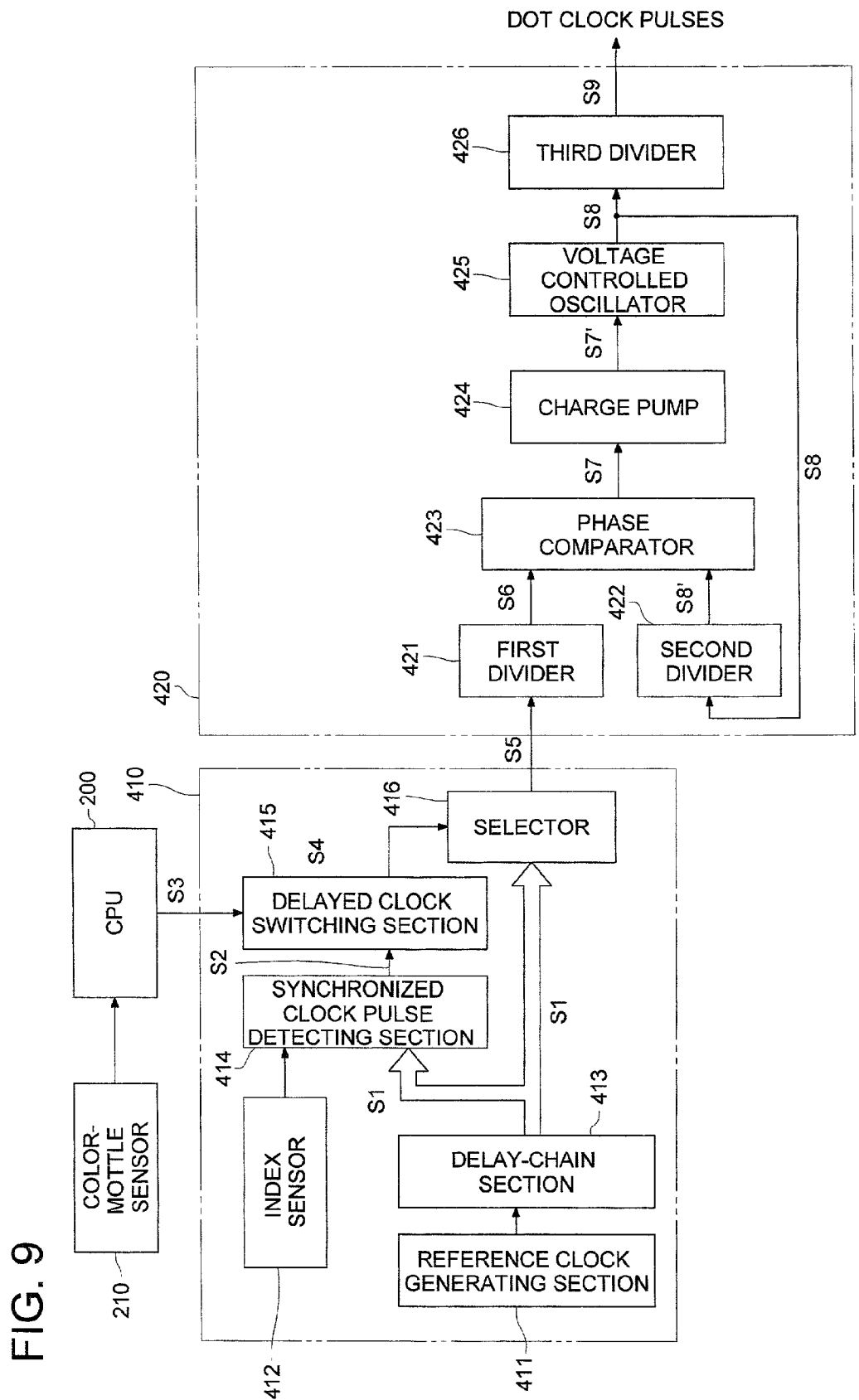
FIG. 9 shows a block diagram of a detailed configuration of the clock-generating circuit embodied in the present invention.

Referring to FIG. 9, which shows a more concrete circuit configuration of the jitter-suppressing section 420, the jitter-suppressing operation will be detailed in the following. As shown in FIG. 9, a PLL (Phase Locked Loop) circuit is employed for dividing and multiplying operations performed in the jitter-suppressing section 420 mentioned above.

The jitter-suppressing section 420, shown in FIG. 9, comprises the following structural elements. Numeral 421 indicates a first divider serving as a first dividing means for dividing the dot clock pulses, the number of which is adjusted at a predetermined number, numeral 422 indicates a second divider serving as a second dividing means for dividing dot clock pulses sent from a voltage controlled oscillator, numeral 423 indicates a phase comparator for comparing frequencies and phases of both outputs of the first divider 421 and the second divider 422 each other to outputs a comparison result voltage, numeral 424 indicates a charge pump for converting the output voltage of the phase comparator 423 to a drive-voltage for driving a voltage controlled oscillator, numeral 425 indicates a voltage controlled oscillator (VCO), which generates dot clock pulses having a frequency corresponding to the drive-voltage converted from the frequency-phase comparison result voltage, and numeral 426 indicates a third divider serving as a third dividing means for dividing the output pulses of the voltage controlled oscillator 425 to output a final dot clock pulses having a desired frequency.

Referring to the block diagram shown in FIG. 9 and the time chart shown in FIG. 10, the operation for suppressing the jitters will be detailed in the following.

When the dot clock-generating section 410 conducts the dot clock adjusting operation, the jitters, generated by adjusting the period of dot clock pulses having a fundamental period, are indicated at the central portion of line (a) in FIG. 10. There are indicated total four pulses including two pulses in the leading portion of the jitter occurring point and other two pulses in the trailing portion of the jitter occurring point.

In the embodiment shown in FIG. 9, the dividing ratio of the first divider 421 is set at 1/4, and the first divider 421 divides four dot clock pulses (S5 in FIG. 9, (a) in FIG. 10), including jitters caused by the dot clock adjusting operation, into one pulse ((b) in FIG. 10).

On the other hand, the voltage controlled oscillator 425 generates dot clock pulses having a frequency in the vicinity of ten times of the desired clock frequency, and the second divider 422, the dividing ratio of which is set at 1/40, divides the dot clock pulses generated by the voltage controlled oscillator 425 to output divided pulses (S8' in FIG. 9).

The frequency-phase comparison between divided pulses outputted by both the first divider 421 and the second divider 422 is performed in the phase comparator 423 to output the frequency-phase comparison results, which are converted to the drive-voltage by the voltage-integrating action of the charge pump 424. The frequency of the dot clock pulses outputted by the voltage controlled oscillator 425 varies depending on the drive-voltage outputted by the charge pump 424, and is divided by the third divider 426, the dividing ratio of which is set at 1/10, in order to output the final dot clock pulses having the desired frequency (S9 in FIG. 9). Incidentally, the third divider 426 is not necessary required for the abovementioned configuration. In addition, it is desirable that the dividing ratio of the third divider 426 is set at an even number in order to set the duty-cycle of the final dot clock pulses at 50%.

In the above case, since the dividing ratio of the third divider 426 is set at 1/4, the jitter component can be dispersed into four pulses, and as a result, the amplitude of the jitters included in the final dot clock pulses (S9 in FIG. 9) can be suppressed to 1/4 of that in the original dot clock pulses (S5 in FIG. 9).

In other words, in the above case, although the jitters are generated by increasing or decreasing the period of each clock-pulse, the influence of the jitters can be dispersed by the dividing operation corresponding to the dividing ratio. Further, since the frequency of the divided dot clock pulses, in which the influence of the jitters are suppressed, are multiplied into the desired frequency to generate the final dot clock pulses, the number of the final dot clock pulses is adjusted at the predetermined number, and the influence of the jitters generated during the adjusting operation is reduced corresponding to the dividing ratio.

As a result, in case of generating dot clock pulses having a predetermined number of reference clock pulses within a predetermined time interval, it becomes possible to suppress the influence of the jitters occurring at the switching point of the clock period with a simple circuit configuration.

In addition, in the abovementioned embodiment, since the PLL circuit, comprising the dividing means, the phase comparing means and the voltage controlled oscillator, is employed for performing the dividing and multiplying operations to suppress the jitters, it becomes possible to suppress the influence of the jitters occurring at the switching point of the clock period with the simple circuit configuration including a combination of the digital-delay dot clock adjusting means and the PLL circuit, while generating dot clock pulses having a predetermined number of reference clock pulses within a predetermined time interval.

Accordingly, when the image formation is performed with the dot clock pulses in which the jitters are suppressed according as the process mentioned above, it is possible to form an image without generating any degradation of its quality due to the influence of the jitters.

Incidentally, in the monochrome image formation, it is possible to suppress the density unevenness, while, in the color image formation, the reduction of the jitters allows to eliminate color mottle in the image, though there is a possibility that the color mottle might be generated by slight deviations of exposing light caused by occurrences of the jitters at different positions, since, sometimes, the main-scanning magnification factors for primary colors are different each other. In addition, in the duplex image formation, it is possible to form duplex images without being influence by the jitters, even if the main-scanning magnification factors of obverse and reverse sides are different each other.

Although the four-color image-forming apparatus having four image-forming units each of which corresponds to each of four primary colors is exemplified in the above explanations, it is possible to eliminate a color mottle in a color image formed with at least two colors through the same process. In addition, the present invention can be also applied to an image-forming apparatus having more than four image-forming units.

As detailed in the above, according to the present invention, to generate dot clock pulses having a predetermined number of pulses within a predetermined time interval in a constant exposing range of the writing means, the period of each clock-pulse is slightly increased or reduced by changing a selection of a plurality of delayed clock pulses, which are generated by delaying clock-pulses outputted from a reference oscillator in slightly different delay times. Further, the dot clock pulses, adjusted at a predetermined number of pulses, are divided, and then, the divided dot clock pulses are multiplied to generate the final dot clock pulses having a desired clock frequency. In the abovementioned process, although the jitters are generated by slightly increasing or decreasing the period of the dot clock pulses, the dividing operation disperses the influence of the jitters corresponding to the dividing ratio. Further, since the frequency of the divided dot clock pulses, in which the influence of the jitters are suppressed, are multiplied into the desired frequency to generate the final dot clock pulses, the number of the final dot clock pulses is adjusted at the predetermined number, and the influence of the jitters generated during the adjusting operation is reduced corresponding to the dividing ratio. As a result, in case of generating dot clock pulses having a predetermined number of reference clock pulses within a predetermined time interval, it becomes possible to suppress the influence of the jitters occurring at the switching point of the clock period with the simple circuit configuration.

Disclosed embodiment can be varied by a skilled person without departing from the spirit and scope of the invention.

What is claimed is:

1. A circuit for generating dot clock pulses utilized for an imageforming apparatus having an image-writing section, comprising:
   a digital-delay dot clock adjusting section to generate first dot clock pulses having a predetermined number of pulses within a predetermined time interval at a constant exposing range of said image-writing section for making a correction against a deviation expanded or contracted, wherein each period of said first dot clock pulses is slightly increased or reduced by changing a successive selection for a plurality of delayed clock pulses, which are generated successively in slightly different delay times by delaying clock-pulses, outputted from a reference oscillator, in slightly different delay times; and
   a jitter suppressing section to suppress a jitter component included in said first dot clock pulses, wherein said jitter suppressing section divides said first dot clock pulses to generate second dot clock pulses, and then, multiplies said second dot clock pulses to generate said dot clock pulses.

2. The circuit of claim 1,
wherein said jitter suppressing section comprises,
   a voltage controlled oscillator to generate said second dot clock pulses;
   a first divider to divide said first dot clock pulses outputted by said digital-delay dot clock adjusting section;
   a second divider to divide said second dot clock pulses generated by said voltage controlled oscillator; and
   a phase comparator to perform a frequency-phase comparison between first divided dot clock pulses outputted by said first divider and second divided dot clock pulses outputted by said second divider to output a comparison result voltage, and
wherein said phase comparator feedbacks said comparison result voltage to said voltage controlled oscillator so as to constitute a phase locked loop, serving as a flywheel oscillator to disperse said jitter component.

3. An image-forming apparatus, comprising:
an image-bearing member to bear a electrostatic latent image and/or a toner image on it;
an image-writing device to scan a surface of said image-bearing member with a scanning-light deflected by a rotating polygon mirror;
a modulating section that performs a pulse width modulation or a light-intensity modulation of dot clock pulses in response to image data to generate a scanning-light modulation signal to be fed to said image-writing device;
a developing section that develops said electrostatic latent image, formed on said image-bearing member by said scanning-light, to form said toner image as a visual image;
a transferring section to transfer said toner image borne on said image-bearing member to a transfer material;
a fixing section to fix said toner image, transferred to said transfer material, onto said transfer material;
a digital-delay dot clock adjusting section to generate first dot clock pulses having a predetermined number of pulses within a predetermined time interval at a constant exposing range of said image-writing section for making a correction against a deviation expanded or contracted, wherein each period of said first dot clock pulses is slightly increased or reduced by changing a successive selection for a plurality of delayed clock pulses, which are generated successively in slightly different delay times by delaying clock-pulses, outputted from a reference oscillator, in slightly different delay times; and
a jitter suppressing section to suppress a jitter component included in said first dot clock pulses, wherein said jitter suppressing section divides said first dot clock pulses to generate second dot clock pulses, and then, multiplies said second dot clock pulses to generate said dot clock pulses.

4. The image-forming apparatus of claim 3, wherein said jitter suppressing section comprises,
- a voltage controlled oscillator to generate said second dot clock pulses;
- a first divider to divide said first dot clock pulses outputted by said digital-delay dot clock adjusting section;
- a second divider to divide said second dot clock pulses generated by said voltage controlled oscillator; and
- a phase comparator to perform a frequency-phase comparison between first divided dot clock pulses outputted by said first divider and second divided clot clock pulses outputted by said second divider to output a comparison result voltage, and wherein said phase comparator feedbacks said comparison result voltage to said voltage controlled oscillator so as to constitute a phase locked loop, serving as a flywheel oscillator to disperse said jitter component.

5. The image-forming apparatus of claim 3, wherein said imageforming apparatus forms a color image based on a plurality of primary colors, and said image-writing device, said digital-delay dot clock adjusting section and said jitter suppressing section are provided corresponding to each of said primary colors.

6. The imageforming apparatus of claim 3, wherein said imageforming apparatus forms an obverse image and a reverse image on both sides of said transfer material, so that a position of said obverse image coincides with a position of said reverse image.

* * * * *